Feb. 13, 1951 L. W. LOCKWOOD 2,541,876
FISHING ROD AND REEL
Filed Nov. 7, 1947
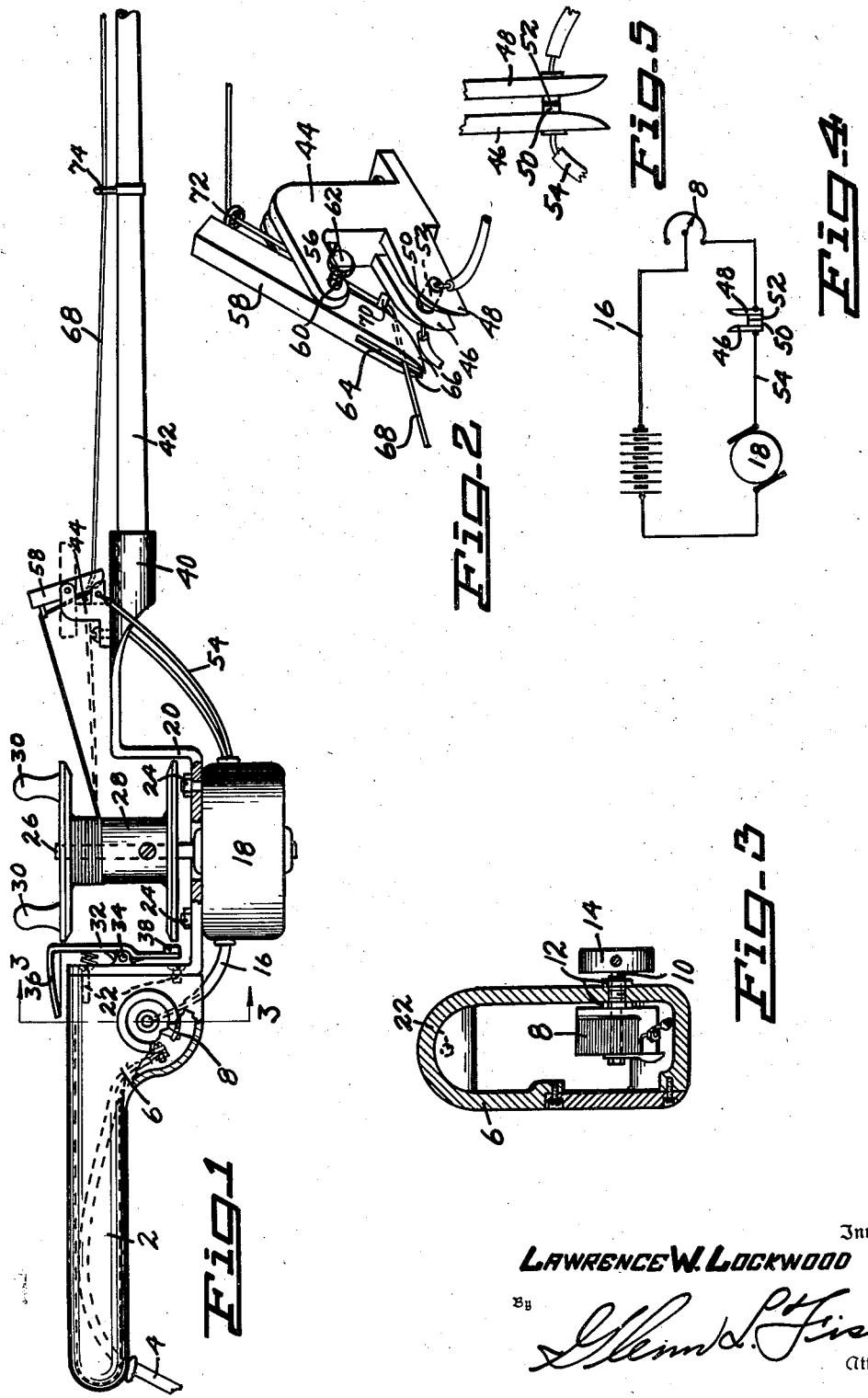
Inventor
LAWRENCE W. LOCKWOOD
By
Glenn L. Fish
Attorney Patented Feb. 13, 1951

2,541,876

UNITED STATES PATENT OFFICE 2,541,876

FISHING ROD AND REEL

Lawrence W. Lockwood, Spokane, Wash.

Application November 7, 1947, Serial No. 784,635

2 Claims. (Cl. 43—21)

My present invention relates to an improved fishing rod and reel of the type having an electric driven, motor actuated, winding reel, the speed and power of which is governed and controlled by a rheostat, and provided with a line actuated switch to energize the motor, when a fish has struck and pulled the line taut, to reel in the hooked fish.

The rheostat may, of course, be set to control the speed of the reeling motor to wind in the line and if the fish should run, the power may be adjusted to permit the pull of the fish to overcome the energy of the motor to reverse the direction of rotation of the armature.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the device of my invention.

Fig. 2 is a perspective view of the switch.

Fig. 3 is a sectional view at line 3—3 of Fig. 1.

Fig. 4 is a diagrammatic view of the electrical circuit.

Fig. 5 is a plan view of the switch contact elements.

Referring now to the drawings wherein I have illustrated the present preferred embodiment of my invention. I employ a hollow handle 2 to be held by the operator or fisherman and enclosing the cord or wire 4 connected to a suitable source of electrical current. The handle has an enlarged housing portion 6 in which is located a conventional rheostat 8 mounted about shaft 10 and secured by lock nuts 12 in one wall of the enlarged portion of the handle. A knob 14 exterior of the housing and on the shaft provides a ready control for the rheostat. The cord 16 connects the rheostat with the conventional motor 18 mounted in bracket 20 which is secured by screws 22 to the housing 6, the motor being secured to the bracket by screws 24.

A shaft 26 from the motor carries the reel 28 which has manual control knobs 30. A brake 32 pivotally mounted on the bracket at 34 has a hand control 36 for the shoe shown at 38 engageable with one end disk of the reel to brake the rotation thereof.

The bracket 20 has an extension formed into a cylindrical socket 40 for the fishing rod 42 and on this socket I secure a switch body 44 having contact arms 46 and 48 provided with contacts 50 and 52 respectively connected by wires 54 to the motor. Arms 56 of the switch body pivotally carry the actuator 58 on shaft 60 and the tension of the pivot may be varied by thumb screw 62. The actuator has an end slot 64 forming bifurcated legs tapered at 66 so that they may be releasably secured between the contact arms of the body.

The fishing line 68 is wound about the reel and extends between the legs 66 and through eyes 70 and 72 on the switch actuator thence to and through the eye 74 of the rod.

In operation, with the line wound on the reel, the actuator is set between the contact arms and the rheostat set as desired. The line and its hook may be cast or trolled and the slight pressure thereon will not affect the actuator. However, should a fish strike, the pull will pivot the actuator, allowing the contact arms to pull together closing the contacts and energizing the motor. The reel will rotate winding in the line. If the fish should fight and attempt to run, his power may be greater than that of the motor and will reverse the direction of the reel. The rheostat may of course be adjusted as appears necessary to allow the fish to run, and when desirable the rheostat may be adjusted further to assure the winding in of the line.

By means of the device of my invention the labor of fishing, especially for game fish, will be reduced, and with a more even pull on the line a smaller number of losses may be expected.

Having thus fully described my invention what I claim as new and desire to secure by Letters Patent is:

1. A fishing rod having a motor driven reel and an electric circuit therefor, a rheostat in the circuit controlling the power of the motor, a pair of resilient switch arms in the circuit, an actuator pivotally mounted on the rod and releasably retained between the arms to maintain the circuit open, and means including the fishing line for pivoting the actuator upon the application of external pressure to the end of the line to close the circuit.

2. A fishing rod having a motor driven reel and an electric circuit therefor, a variable rheostat in the circuit controlling the power of the motor, a supporting bracket for the motor and reel, an extension on the bracket having a socket for the fishing rod, a switch body mounted on the bracket extension and having a pair of resilient switch arms in the circuit, an actuator pivotally mounted on the body having one end bifurcated to form legs tapered for releasable engagement with the arms, and a fishing line on the reel passing through the slotted end of the actuator and then running along the length of the actuator whereby the application of external pressure on the end of the line will pivot the actuator to close the circuit.

LAWRENCE W. LOCKWOOD.

REFERENCES CITED

The following references are of record in the file of this patent:

UNITED STATES PATENTS

| Number | Name | Date |
|---|---|---|
| 625,829 | Cook | May 30, 1899 |
| 902,447 | Piper | Oct. 27, 1908 |
| 2,262,671 | Fanshier | Nov. 11, 1941 |